UNITED STATES PATENT OFFICE.

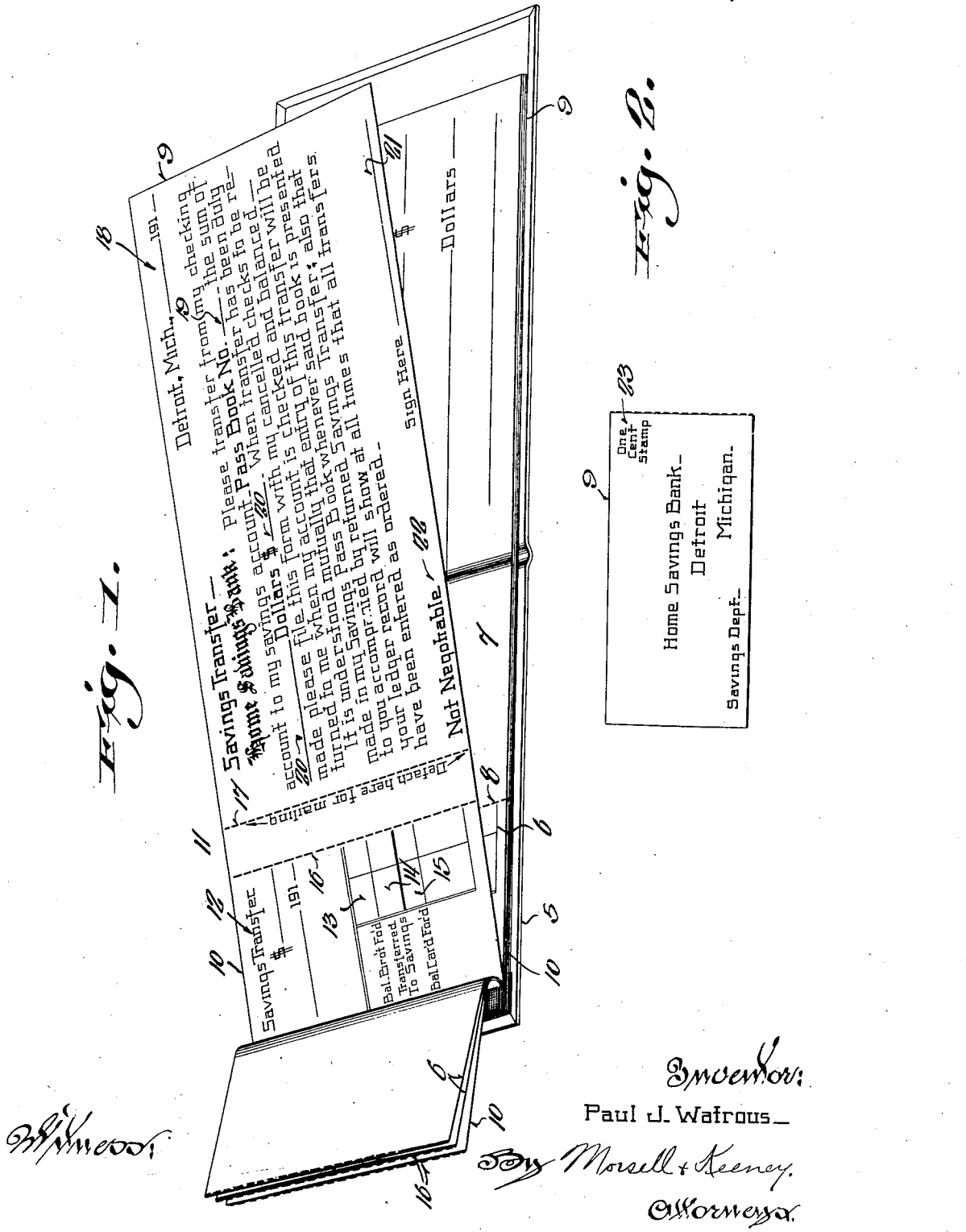

PAUL J. WATROUS, OF PASADENA, CALIFORNIA, ASSIGNOR OF ONE-HALF TO RICHARD B. WATROUS, OF NEW YORK, N. Y.

FORM EMPLOYED IN TRANSFER SYSTEMS.

1,370,936.        Specification of Letters Patent.     Patented Mar. 8, 1921.

Application filed October 4, 1919. Serial No. 328,390.

*To all whom it may concern:*

Be it known that I, PAUL J. WATROUS, a citizen of the United States, and resident of Pasadena, in the county of Los Angeles and State of California, have invented new and useful Improvements in Forms Employed in Transfer Systems, of which the following is a description, reference being had to the accompanying drawings, which are a part of this specification.

The present invention relates to what may be termed a savings transfer system, and refers more particularly to the transfer blank or form used in connection therewith.

The banking institutions of the present day are spending large sums of money to encourage regular and consistent saving on the part of their customers, and my invention has for one of its objects to provide means which will at intervals present a reminder to a customer of a bank of the fact that he should save, and at the same time provide means whereby he may readily transfer any desired sum of money from his checking account to his savings account.

Another object of the present invention is to provide a system of savings transfer which will eliminate the necessity of going to the bank personally to transfer a sum of money from a checking account to a savings account by providing in the check books a blank form of regulation postal card size, which may be detached, filled in and signed to be an order upon the bank to transfer the desired sum of money from the checking account to the savings account.

A further object of the present invention is to provide a savings transfer form of the class described which may be readily mailed to the bank as an order thereon to transfer a sum of money from the checking account to the savings account, and having means thereon to indicate that the same is not negotiable.

A still further object of the present invention is to provide a savings transfer blank or form of the class described, which may be inserted in check books at intervals to be a constant reminder to customers of the bank to transfer money from their checking account to their savings account, or which may be inserted in any desired number in the back of the check book, or which may be issued in pad form.

A still further object of the present invention is to provide a savings transfer form of the class described having a stub detachably connected therewith, provided with spaces for receiving the balance carried forward from the preceding check stub, for the amount transferred to the savings account by the transfer form, and the balance carried forward after the savings transfer has been deducted from the checking account, a detachable connecting strip connecting the stub with the transfer form, whereby the transfer form, when detached, will be of regulation postal card size, and the stub at the same time conform in size with the ordinary check stubs of the check book in which the form is secured.

With the above and other objects in view which will appear as the description proceeds, my invention resides in the novel construction, combination and arrangement of parts substantially as hereinafter described and more particularly defined by the appended claim, it being understood that such changes in the precise embodiment of the hereindisclosed invention may be made as come within the scope of the claim.

In the accompanying drawing I have illustrated one complete example of the physical embodiment of my invention constructed according to the best mode I have so far divised for the practical application of the principles thereof, and in which:

Figure 1 is a perspective view of an open check book depicting one of the savings transfer forms, together with the stub detachably carried thereby, and Fig. 2 is a plan view of the reverse or mailing side of the savings transfer form, the form being detached from the check book stub.

Referring now more particularly to the accompanying drawing, the numeral 5 designates a check book folder or cover, in the present instance being of the foldable pocket type, having disposed therein a plurality of blank check stubs 6 and blank checks 7, detachably connected thereto by perforations 8. All the foregoing is of well-known construction and employed by practically every banking institution, and constitutes no part of my invention except in relation with my savings transfer form, now about to be described.

My invention contemplates the insertion at intervals in the check book of a novel form of savings transfer blank or form 9, having certain subject matter thereon which when properly filled in and signed, by a person having a checking account and a savings account with the bank issuing the same, becomes an order on the bank to transfer a desired sum of money from the checking account of the signer to his savings account, as will be later described. The blank or form 9 is detachably connected with a record stub 10 by means of a connecting strip 11, the connecting strip 11 being provided so that the form 9 will be of regulation postal card size, and at the same time the stubs 10 conform in size with the stubs 6 of the check book. The connecting strip 11 is necessary to adapt the form 9 of the regulation size of check which is approximately 6½ inches long, whereas the regulation length for postal cards is somewhat shorter than the check blank.

The stub 10 has printed thereon the words "Savings transfer," as indicated at 12, and has therebeneath a space for receiving the amount which it is desired to transfer, together with the date upon which the transfer was made. The stub 10 is also provided with a space 13 for receiving the balance brought forward from the preceding stub 6, a space 14 for receiving the amount of money which it is desired to transfer by the attached blank or form 9, and a space 15 for receiving the balance carried forward after the savings transfer has been deducted from the checking account. The strip 11 is connected to the stub 10 by perforations 16 and is connected to the adjacent blank or form 9 by perforations 17, the designation "Detach here for mailing" being printed on the connecting strip 11 adjacent the perforations 17.

The blank or form 9 is worded as illustrated in Fig. 1, although it will be readily understood that I do not wish to be held strictly to this wording, and a blank space 18 is provided thereon for filling in the date on which the transfer is made. A blank space 19 is also provided adjacent the designation "Pass Book No." for receiving the number of the savings account pass book of the signer, and blank spaces 20 are provided for receiving the amount of money which it is desired to transfer from the checking account to the savings account. At the end of the subject matter on the blank or form 9, is a line 21 indicated by the designation "Sign here" for the signature of the person transferring money from his checking account to his savings account. The blank or form 9 also has printed on the side bearing the subject matter before referred to, a suitable designation 22, indicating that the form is not negotiable, this designation being preferably the words "Not negotiable" printed in black face type so that the same will stand out prominently.

On the reverse side of the blank or form 9, see Fig. 2, is printed the name and address of the bank issuing the check books containing the forms 9, together with a suitable designation 23, in the upper right hand corner, to indicate that a stamp should be placed thereon before mailing. Thus, it will be readily apparent that each blank or form 9 is a self-addressed postal card, which when the subject matter, illustrated in Fig. 1, is properly filled in and signed by a person having a checking account with the bank issuing the same, becomes an order on the bank for a transfer of a desired sum of money from the checking account of the signer to his savings account, at the same time the form being so marked as to indicate that the same is not negotiable, so that it will be of no value to any one but the bank, and thus, its mailing as a postal card is permissible. My savings transfer form is to be distinguished from a check as there is no similarity in appearance, and in fact, it is so marked as to make it readily apparent that the same is not a check.

As most people hesitate to send in the open mail any valuable document, it is my intention to get as far away as possible from the conventional form of check and thus overcome this prejudice. Besides being of value to the bank customers in that they will be encouraged to save regularly by being reminded at intervals by the forms 9 in their check books, my system will be of great value to the banks, as at present they are spending immense sums of money and a large amount of time in an endeavor to educate the people to save. The present method of advertising employed by the banks is objectionable in that the advertisement of one bank is, in a sense, an advertisement for a competing bank. The savings transfer affords banks throughout the country an opportunity to form an alliance under which they can use advertising in national magazines to the advantage of their particular banks.

For example, if one thousand banks in as many cities and towns adopt this system, they will be enabled to insert in the magazines a joint advertisement in which their particular names and addresses will appear, thus pointing out to readers the bank in their home town which offers the savings transfer system. This latter advantage is important for the reason that at present practically all banks afford the same service to patrons; one bank which spends money locally to advertise the idea of saving, helps the non-advertising bank as well as itself.

It will be understood that for convenience, the savings blank may be numbered consecutively with the checks of the book in which they are inserted, or may be numbered separately.

What I claim as my invention is:

A check book of the class described comprising a plurality of stubs, blank checks detachably connected to the stubs, and savings transfer forms disposed within the check book, said forms being connected with certain of the stubs by means of a detachable connecting strip whereby the forms may be of regulation postal card length when detached from the book and the stubs connected therewith of uniform size with respect to the other stubs when the forms are detached, and said forms, when signed and filled in by a person having a checking account with the bank issuing the check book, being an order on the bank to transfer a desired sum of money, from the checking account of the signer to his savings account.

In testimony whereof, I affix my signature.

PAUL J. WATROUS.